(12) United States Patent
Huang et al.

(10) Patent No.: US 11,636,050 B2
(45) Date of Patent: Apr. 25, 2023

(54) COMPUTER SYSTEM, REMOTE CONTROL MONITORING SYSTEM, AND REMOTE CONTROL MONITORING METHOD

(71) Applicant: NEXCOM International Co., Ltd.

(72) Inventors: Tsung-Hsi Huang, New Taipei (TW); Shih-Fan Kao, New Taipei (TW); Chih-Ming Kao, New Taipei (TW); Shin-Wei Lee, New Taipei (TW); Yi-Tung Chiu, New Taipei (TW)

(73) Assignee: NEXCOM INTERNATIONAL CO., LTD., New Taipei (TW)

( * ) Notice: Subject to any disclaimer, the term of this patent is extended or adjusted under 35 U.S.C. 154(b) by 139 days.

(21) Appl. No.: 17/313,898

(22) Filed: May 6, 2021

(65) Prior Publication Data
US 2022/0358057 A1 Nov. 10, 2022

(51) Int. Cl.
*G06F 13/12* (2006.01)
*G06F 13/40* (2006.01)
*G06F 9/4401* (2018.01)

(52) U.S. Cl.
CPC .......... *G06F 13/126* (2013.01); *G06F 9/4401* (2013.01); *G06F 13/128* (2013.01); *G06F 13/4072* (2013.01); *G06F 13/4081* (2013.01)

(58) Field of Classification Search
CPC .... G06F 13/126; G06F 9/4401; G06F 13/128; G06F 13/4072; G06F 13/4081
See application file for complete search history.

(56) References Cited

U.S. PATENT DOCUMENTS 9,495,124 B1 * 11/2016 Earl .................. G06F 3/1423
2003/0058248 A1 * 3/2003 Hochmuth ....... H04N 21/23406
375/E7.264

(Continued)

FOREIGN PATENT DOCUMENTS

CN 211653609 U 10/2020
EP 2804095 A1 * 11/2014 .......... G06F 3/1454

(Continued)

OTHER PUBLICATIONS

Search Report dated Jul. 30, 2021 of the corresponding European patent application No. 21173075.9.

(Continued)

*Primary Examiner* — Phong H Dang
(74) *Attorney, Agent, or Firm* — Chun-Ming Shih; HDLS IPR Services

(57) ABSTRACT

A computer system, remote control monitoring system, and remote control monitoring method are provided to instantly provide the local display screen of the local computer to the remote computer for remote real-time display. The remote control monitoring system is arranged in the local computer and has a signal receiver and a remote controller. The signal receiver receives the video signal from the processor, executes the signal transforming process to generate the video signal in different standards. The remote controller executes a network compressing process on the transformed video signal to generate the network transportable video data, and transmits the data to the remote computer for displaying the corresponding remote display screen on the remote computer. The present disclosure enables the implementing of the out-of-band remote displaying.

20 Claims, 13 Drawing Sheets

(56) References Cited

U.S. PATENT DOCUMENTS

| | | | |
|---|---|---|---|
| 2014/0283087 A1* | 9/2014 | Poornachandran | G06F 21/84 |
| | | | 726/26 |
| 2020/0043444 A1* | 2/2020 | Lambert | G09G 5/39 |
| 2020/0410961 A1* | 12/2020 | Chen | G09G 5/373 |
| 2022/0021838 A1* | 1/2022 | Utukuri | H04N 5/38 |

FOREIGN PATENT DOCUMENTS

| | | |
|---|---|---|
| EP | 2804095 A1 | 11/2014 |
| TW | I325107 B | 5/2010 |
| TW | I518508 B | 1/2016 |

OTHER PUBLICATIONS

Office Action dated Feb. 24, 2022 of the corresponding Taiwan patent application No. 110102329.

* cited by examiner

COMPUTER SYSTEM, REMOTE CONTROL MONITORING SYSTEM, AND REMOTE CONTROL MONITORING METHOD

BACKGROUND

Technical Field

The technical field relates to a remote control monitoring, and more particularly related to a computer system, a remote control monitoring system, and a remote control monitoring method.

Description of Related Art

Most of the remote control methods of the related art implement the remote control through software, such as Microsoft Remote Desktop, TeamViewer, or Chrome remote desktop. When the remote control is implemented through software, a local computer (controlled party) must load the operating system and then runs the tool software in the operating system. After this, the remote computer (controlling party) is available to connect to the local computer and execute the remote control on the local computer. For example, the display screen of the local computer can be shown on the remote computer.

Since the above remote control methods are executed only in the operating system, the above remote control methods are only allowed to execute In-Band control, and the access authorities thereof are strict restricted by the operating system. This is inconvenient to users. For example, the display screen of the local computer may not be obtained when the local computer is shut down, or the operating system is not loaded.

Accordingly, there is currently a need for an Out-Of-Band remote mirror display schema to solve the above-mentioned problems.

SUMMARY OF THE PRESENT DISCLOSURE

The present disclosure is direct to a computer system, a remote control monitoring system, and a remote control monitoring method having an ability to obtain the video signal directly from the processor for implementing the remote mirror display.

In one of the exemplary embodiments, a remote control monitoring system is used to provide a local display screen generated by a local computer to a remote computer instantly to implement remote real-time display and includes a signal receiver and a remote controller. The signal receiver is connected to a processor of the local computer, configured to receive a first video signal corresponding to the local display screen from the processor, and configured to execute a signal transforming process on the first video signal to generate a second video signal in a different standard from the first video signal. The remote controller is connected to the signal receiver and a network module of the local computer, configured to execute a network compressing process on the second video signal to generate a video data compatible with a network-transportable standard, and configured to transmit the video data through the network module to the remote computer for displaying a remote display screen corresponding to the local display screen based on the video data. The signal receiver is configured to execute the signal transforming process to transform the first video signal compatible with an output standard of the processor into the second video signal compatible with an input standard of the remote controller.

In one of the exemplary embodiments, a computer system with remote control monitoring includes the above-mentioned remote control monitoring system, a network module, a local display, and a processor. The network module is connected to the remote control monitoring system, configured to connect a remote computer through network, and configured to transmit video data received from the remote control monitoring system to the remote computer. The processor is connected to the remote control monitoring system and the local display, configured to generate a first video signal, and configured to transmit the first video signal to the local display and the remote control monitoring system to control the local display to display a local display screen and the remote computer to display a remote display screen corresponding to the local display screen.

In one of the exemplary embodiments, a remote control monitoring method is used to provide a local display screen generated by a local computer to a remote computer instantly to implement remote real-time display, the local computer includes a signal receiver, a remote controller, a processor, a network module, and a local display. The remote control monitoring method includes: a) by the processor, transmitting a first video signal to the local display for displaying the local display screen; b) by the signal receiver, receiving the first video signal from the processor, executing a signal transforming process on the first video signal to generate a second video signal in a different standard from the first video signal, and transmitting the second video signal to the remote controller; c) by the remote controller, executing a network compressing process on the second video signal to generate a video data compatible with network-transportable standard; and, d) transmitting the video data through the network module to the remote computer for displaying a remote display screen corresponding to the local display screen based on the video data.

The present disclosure may retrieve the video signal directly from the processor to prevent the strict restrictions of access authorities from the operating system, and the out-of-band remote mirror display is implemented.

BRIEF DESCRIPTION OF THE DRAWINGS

The features of the present disclosure are believed to be novel are set forth with particularity in the appended claims. The present disclosure itself, however, may be best understood by reference to the following detailed description of the present disclosure which describes an exemplary embodiment of the present disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
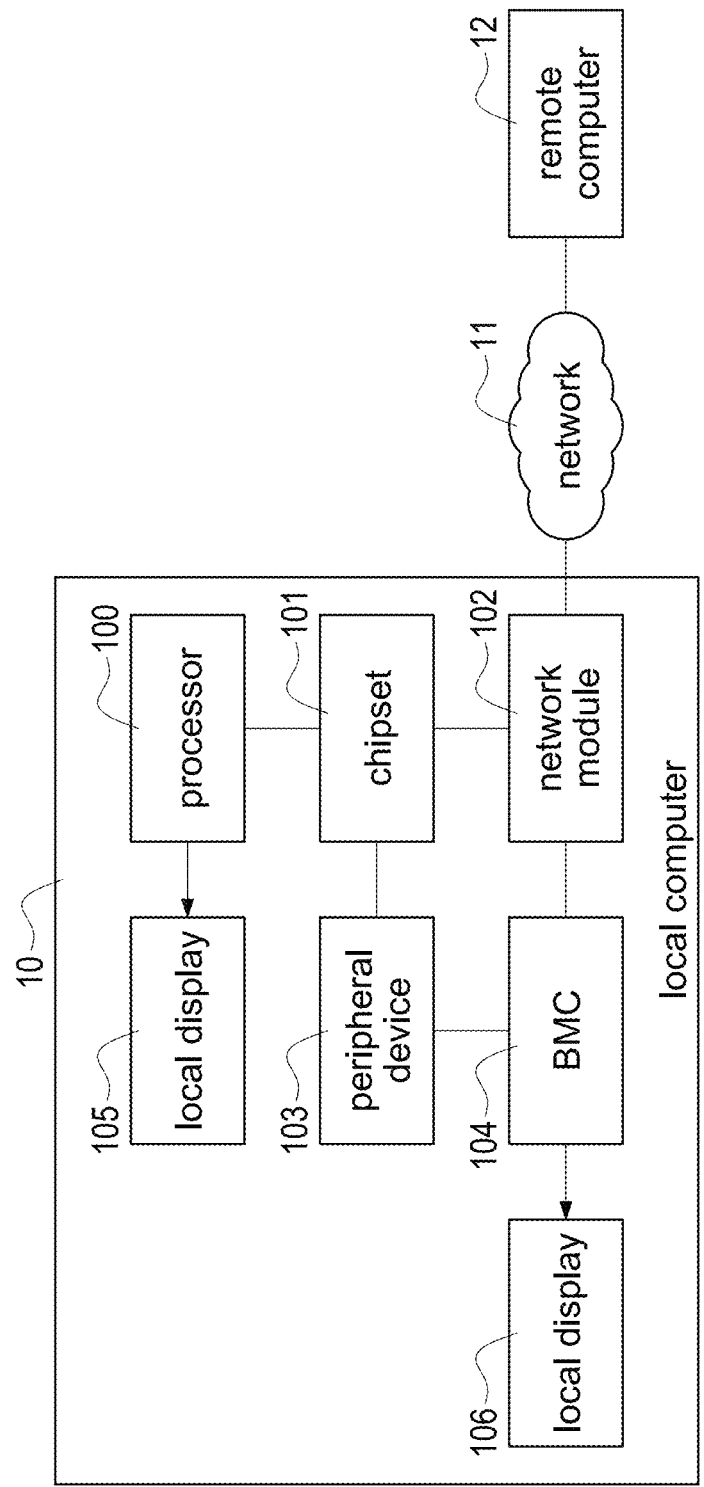
FIG. 1 illustrates an architecture diagram of the remote monitoring system.

Please refer to FIG. 1, FIG. 1 illustrates an architecture diagram of the remote monitoring system. In the remote monitoring system, a Baseboard Management Controller (BMC) 104 is arranged in a local computer 10.

The BMC 104 is connected to the network module 102, and is used to implement the Out-Of-Band management of the local computer 10. For example, a remote computer 12 may control the local computer 10 to be booted, shut down, or obtain status information of peripheral device 103 or chipset 101 through the network 11 and the BMC 104. The remote computer 12 may further control the peripheral device 103 or the chipset 101 of the local computer 10 through the network 11 and the BMC 104.

However, under the architecture of this remote monitoring system, due to the restrictions of access authorities, the BMC 104 is unable to directly receive the video signal (namely, the display screens of the local display 105) generated by the processor, and is unable to implement the remote mirror display. Namely, the BMC 104 does not have the ability to provide the display screens of the local display 105 to the remote computer 12 for mirror display. Besides, the BMC 104 may be further connected to another local display 106, and display the related information on the local display 106.

Figure 2:
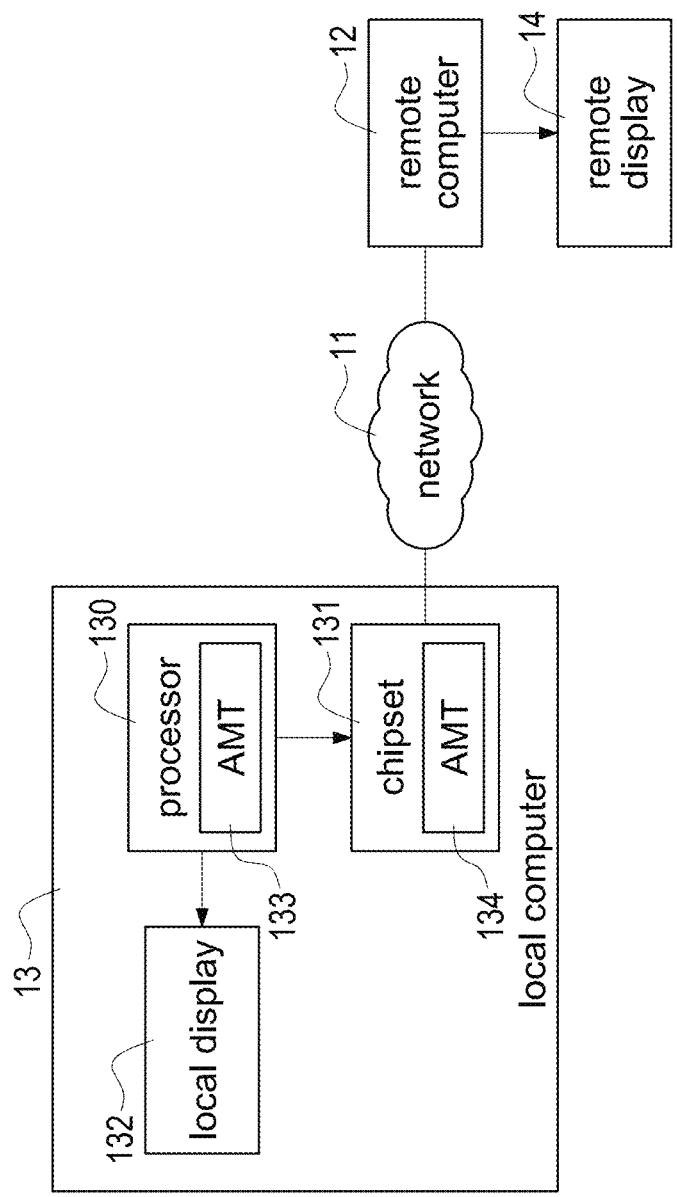
FIG. 2 illustrates an architecture diagram of another remote control system.

Please refer to FIG. 2, FIG. 2 illustrates an architecture diagram of another remote control system. The remote control system uses the Intel Active Management Technology (AMT) provided by Intel® to implement the remote mirror display.

More specifically, inside the local computer 13, AMT 133 is deployed inside the processor 130, and the AMT 134 is deployed inside the chipset 134. AMT 133 of the processor 130 has the ability to transmit the display screens (video signal) to the local display 132 for displaying. Besides, AMT 133 has the ability to transmit the same display screens to the AMT 134 of the chipset 131, and transmit the display screens to the remote computer 12 through the chipset 131 (connected to the above-mentioned network module 102) and network 11, so as to display the mirror display screens of the local display 132 on the remote display 14 and achieve the remote mirror display.

However, the AMT function is deployed only inside the Intel® high-level processor, and must collocate with designated Intel® chips, such that the cost of remote mirror display is high. Namely, the disadvantages of the AMT function are significantly increasing hardware costs and significantly reducing the deployment flexibility of hardware. Moreover, the above-mentioned AMT 133 and AMT 134 are like a black box that no internal architecture is allowed to be inspected. The general deployers are unable to know the specific structure of AMT, and unable to modify or customize the AMT.

To solve the above-mentioned problems, the present disclosure discloses a computer system, a remote control monitoring system, and a remote control monitoring method with remote control monitoring function, the computer system, the remote control monitoring system, and the remote control monitoring method may achieve the Out-Of-Band management and remote mirror display. A detailed explaining is below.

Figure 3:
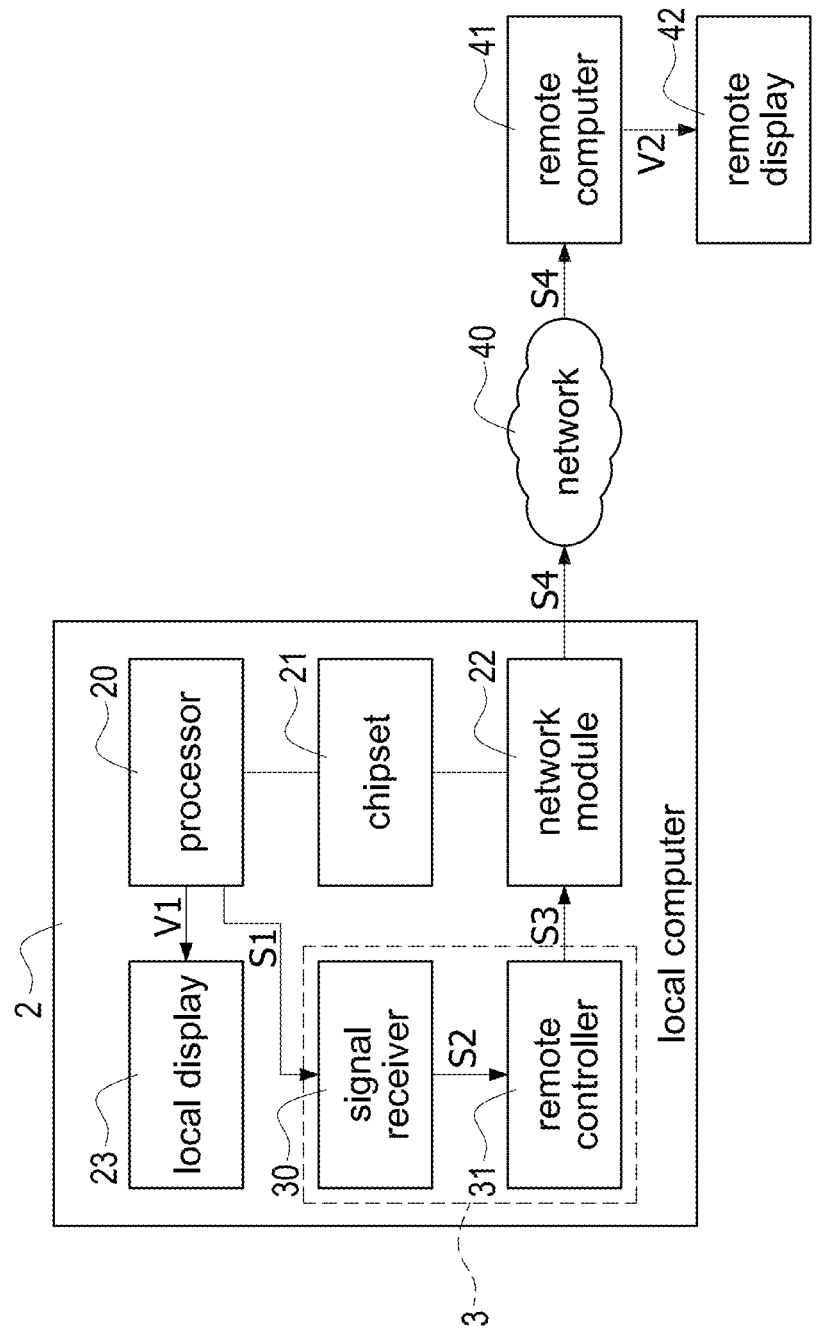
FIG. 3 illustrates an architecture diagram of the computer system of one embodiment of the present disclosure.

Please refer to FIG. 3, FIG. 3 illustrates an architecture diagram of the computer system of one embodiment of the present disclosure. The computer system (hereinafter as local computer 2) with remote control monitoring function of the present disclosure, such as desktop computer, laptop, workstation, server, etc., mainly includes a processor 20, a chipset 21, a network module 22, a local display 23, and a remote control monitoring system 3.

The processor 20, such as CPU (Central Processing Unit), is used to execute the main computation (or calculation) and control. The chipset 21 is electrically connected to the processor 20 and the other devices, such as the network module 21 or the peripheral devices 24 recited below, and used to be controlled by the processor 20 to drive the other devices. The network module 22, such as Ethernet card, Wi-Fi network card, cellular network module, or the other network modules with networking capability, is used to connect to the network 40 (such as the Internet), and communicate with the remote computer 41 through the network 40. The local display 32, such as touchscreen, LCD screen, projector, plasma screen or the other types of displays, is used to display information.

The remote control monitoring system 3 is mainly used to instantly (in real-time) provide the local display screens (namely, the display screen of the local display 23) of the local computer 2 to the remote computer 41, such as the desktop computer, laptop, workstation, server, etc., for remote real-time display.

More specifically, the remote control monitoring system 3 includes a signal receiver 30 and a remote controller 31. The signal receiver 30 may be obtained by modifying the display adapter. The signal receiver 30 is directly connected to the processor 20, and is able to receive the video signal corresponding to the local display screens from the processor 20. The remote controller 31 may be obtained by modifying the BMC or the single-chip controller. The remote controller 31 is used to transmit the received video signal to the remote computer 41 to achieve the remote mirror display.

Figure 9:
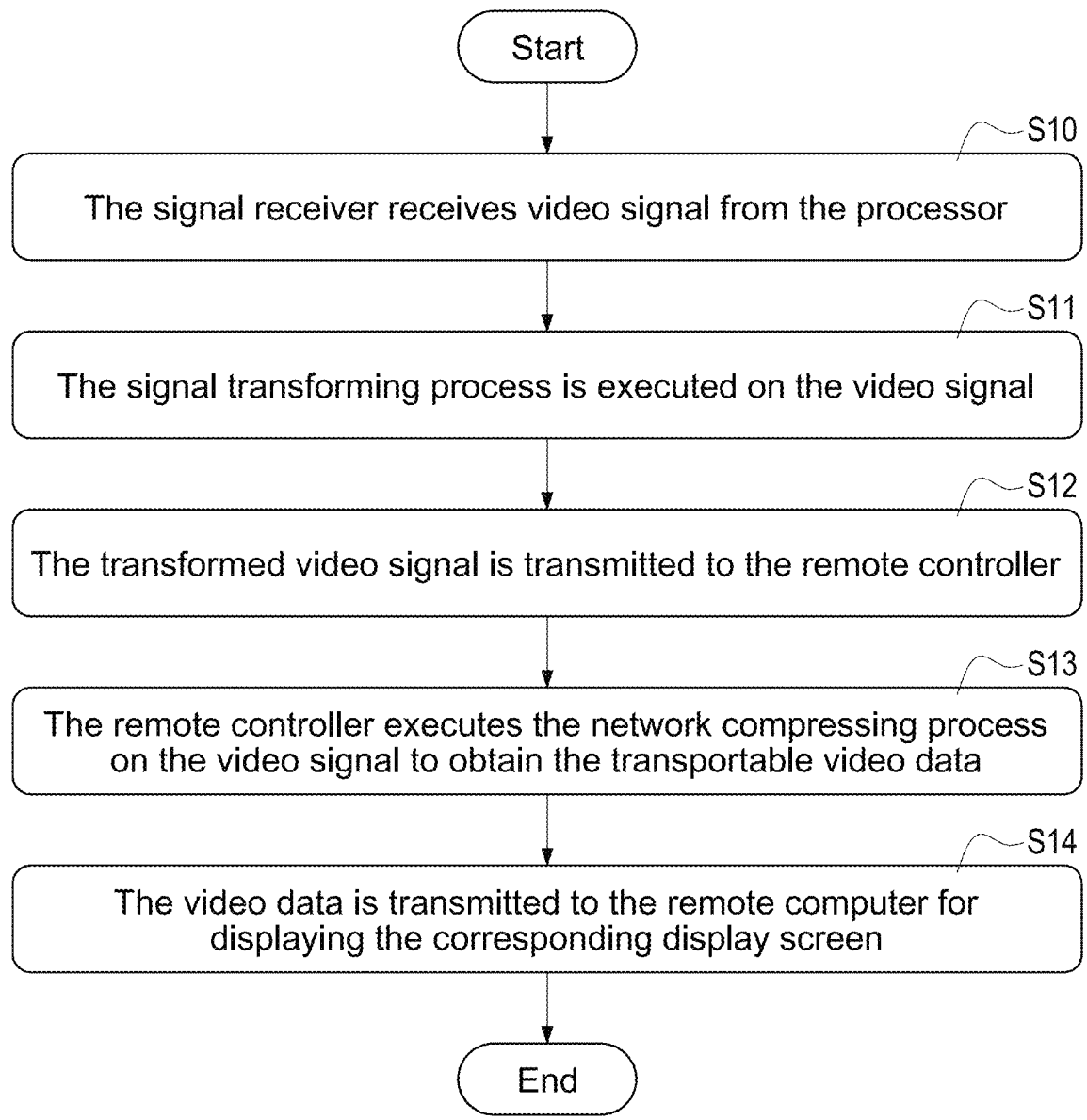
FIG. 9 illustrates a flowchart of the remote control monitoring method of one embodiment of the present disclosure.

More specifically, please also refer to FIG. 9, FIG. 9 illustrates a flowchart of the remote control monitoring method of one embodiment of the present disclosure.

In this exemplary embodiment, when the local computer 2 is operated (such as booting is done), the processor 20 continuously transmits the video signal V1 to the local display 23 to display the local display screens on the local display 23.

Moreover, when the remote mirror display is started, the step S10 is executed, the processor 20 provides the video signal compatible with a first standard (namely, the first video signal S1, such as DisplayPort standard or the other output standard supported by processor 20), and the signal receiver 30 continuously receives the first video signal S1 from the processor 20.

Then, the step S11 is executed, since the remote controller 31 is usually configured to be unable to access the output standard (first standard) of the processor 20, in the present disclosure, the signal receiver 30 is configured to execute a signal transforming process (such as the video standard transformation) on the first video signal S1 to convert the first standard of the first video signal S1 into the input standard (the second standard, such as HDMI standard, VGA standard, DVI standard, TTL standard, LVDS standard, CVBS standard, S-Video standard, YPbPr standard, etc.) supported by the remote controller 31. Thus, the second video signal S2 in a different standard from the first standard can be obtained.

Then, the step S12 is executed, the signal receiver 30 transmits the second video signal S2 to the remote controller 31.

Next, the step S13 is executed, since the general video standards are unable to be transmitted through the network, in the present disclosure, the remote controller 31 executes a network compressing process (such as the streaming transformation) on the second video signal S2 to generate the video data S3 compatible to a network-transportable standard, such as Real Time Streaming Protocol (RTSP).

Next, the step S14 is executed, the remote controller 13 transmits the generated video data S3 to the network module 22, the network module 22 transforms the video data S3 into the network-transportable video data S4, such as data packets, and transmits the video data S4 through the network 40 to the remote computer 41. The remote computer 41 may execute a decoding process which may include the decapsulation, the video standard conversion, etc., on the received video data S4 to obtain the video signal V2, and transmit the video signal V2 to the remote display 42. Thus, the remote display 42 is able to display the remote display screens corresponding to the local display screens.

In one of the exemplary embodiments, the remote display screens are the mirror screens of the local display screens. In other words, the remote display screens have the same framework, typesetting, and displayed content as the local display screens, but the remote display screens shown on the remote display 42 may be configured to different display parameters, such as resolution or aspect ratio, from the local display screens shown on the local display 23.

In one of the exemplary embodiments, a part of each remote display screen may render a display window, this display window is used to show each received local display screen, and another part (display zones) of each remote display screen may be still used to perform the operation to the remote computer 41 or display the information of the remote computer 41.

The present disclosure is able to obtain the video signal directly from the processor 20 to prevent the strict restrictions of access authorities from the operating system, and the out-of-band remote mirror display may be implemented. For example, when the present disclosure is used, the out-of-band remote mirror display, such as the BIOS configuration screen, operating system selection screen, etc., may be achieved.

Figure 4:
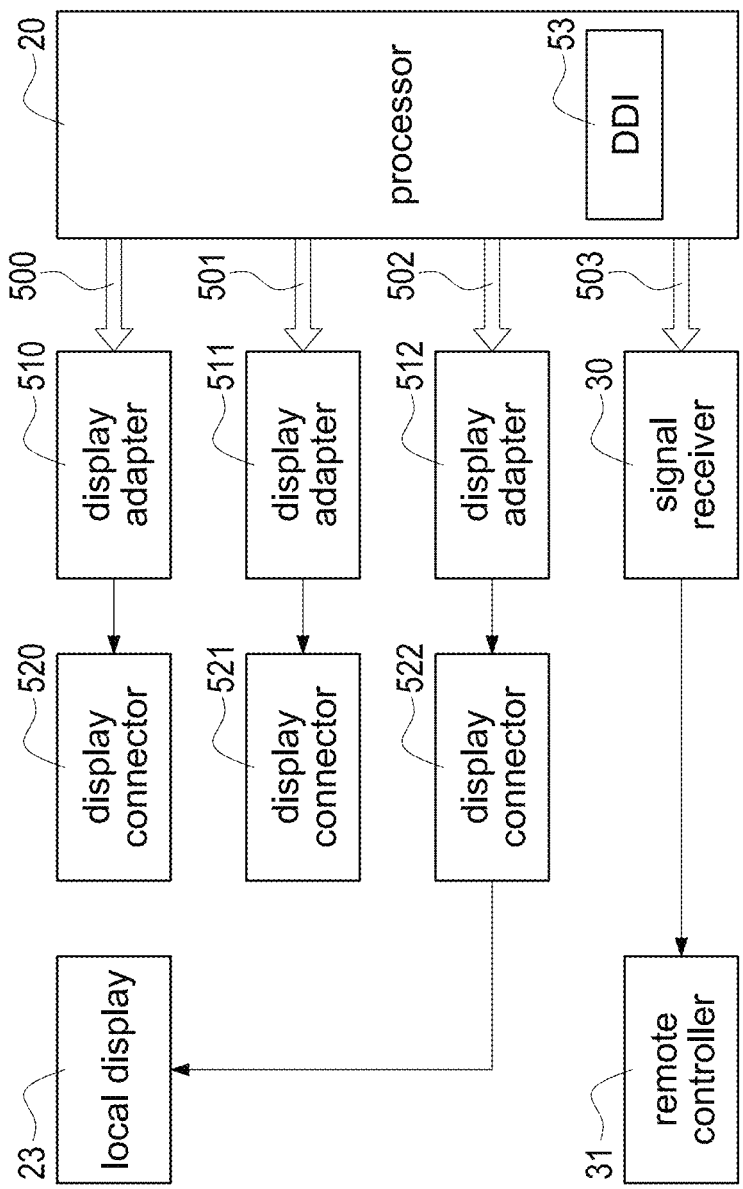
FIG. 4 illustrates an architecture diagram of the video components of one embodiment of the present disclosure.

Please refer to FIG. 4, FIG. 4 illustrates an architecture diagram of the video components of one embodiment of the present disclosure. FIG. 4 is used to exemplarily explain how the signal receiver 30 of the present disclosure receives the above-mentioned first video signal S1 directly from the processor 20.

In this example, the processor 20 includes a DDI 53, the DDI 53 is a module to implement the Data Direct Input (DDI) technology. A main purpose of DDI is to make the processor 20 be able to output the video signal directly to the other device (FIG. 4 uses the display adapters 510-512 and the signal receiver 30 for example) without transmitting through the main memory (such as RAM), so as to achieve high-speed signal transmission.

In this example, the processor 20 includes four video signal ports 500-503, each of the video signal ports 500-503 is configured to output the video signal compatible with the above-mentioned first standard. For example, the video signal ports may be the signal output ports of DisplayPort, and the number of the video signal ports may be modified arbitrarily.

The video signal ports 500-502 are respectively connected to the display adapters 510-512, each display adapter 510-512 are respectively connected to the corresponding display connectors 520-522. Each display adapter 510-512 is used to transform the video signal of the first standard into the video standard supported by the connected display connector 520-522.

For example, the display adapter 512 is configured to transform the video signal from the DisplayPort standard into the HDMI standard, and transmit the HDMI video signal to the display connector 522, such as HDMI connector. Then, the display connector 522 transmits the HDMI video signal to the local display 23 for displaying.

In the present disclosure, one video signal port 503 of the processor 20 is modified to be connected to the signal receiver 30, and the video signal ports 502 and 503 are configured to a mirror display mode. Namely, the video signal outputted by the video signal port 502 is the same as the video signal outputted by the video signal port 503. Thus, the signal receiver 30 may directly receive the mirror video signal through the DDI 53 from the processor 20, execute the signal standard transformation, and provide the transformed video signal through the remote controller 31 and network 40 to the remote computer 41 for displaying.

Figure 5:
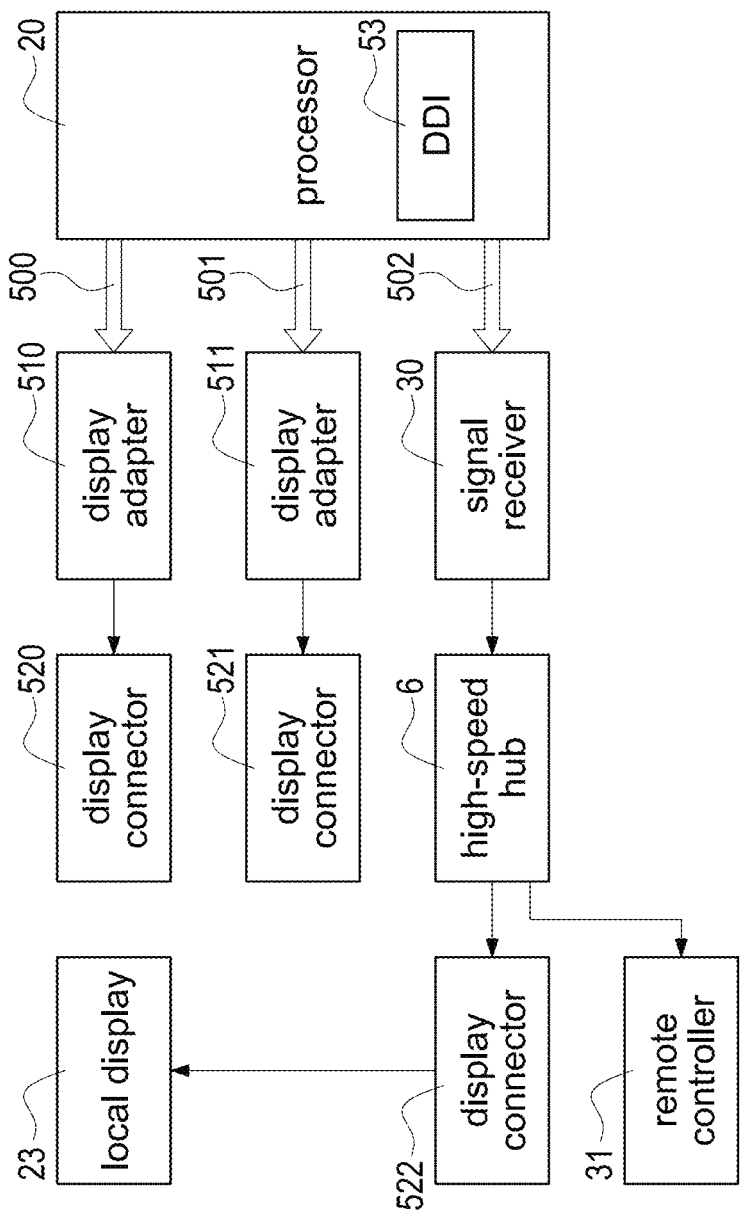
FIG. 5 illustrates an architecture diagram of the video components of one embodiment of the present disclosure.

Please refer to FIG. 5, FIG. 5 illustrates an architecture diagram of the video components of one embodiment of the present disclosure. In the example shown in FIG. 5, the remote control monitoring system may include a high-speed hub 6. The high-speed hub 6 may include one or more input interfaces and multiple output interfaces.

When the display connector 522 and the remote controller 31 are compatible with the same video standard (such as HDMI standard or VGA standard), the present disclosure may directly connect single channel (the signal video signal port 502) separately into multiple channels (the local display 23 and the remote controller 31), so as to omit the configuration related to the above-mentioned mirror display mode.

More specifically, in the present disclosure, the video signal port 502 is connected to the signal receiver 30, one input interface of the high-speed hub 6 is connected to the signal receiver 30, and two output interfaces of the high-speed hub 6 are respectively connected to the display connector 522 (connected to the local display 23) and the remote controller 31. Thus, the first video signal in the first standard provided by the processor 20 is inputted to the signal receiver 30 through the video signal port 502, the signal receiver 30 transforms the first video signal in the first standard into the second video signal in the second standard (such as HDMI standard or VGA standard). Then the second video signal is inputted to the high-speed hub 6, and broadcasted to the display connector 522 and the remote controller 31. Thus, the local display 22 is able to show the local display screens, and the remote display 42 is able to show the mirror remote display screens.

Figure 6:
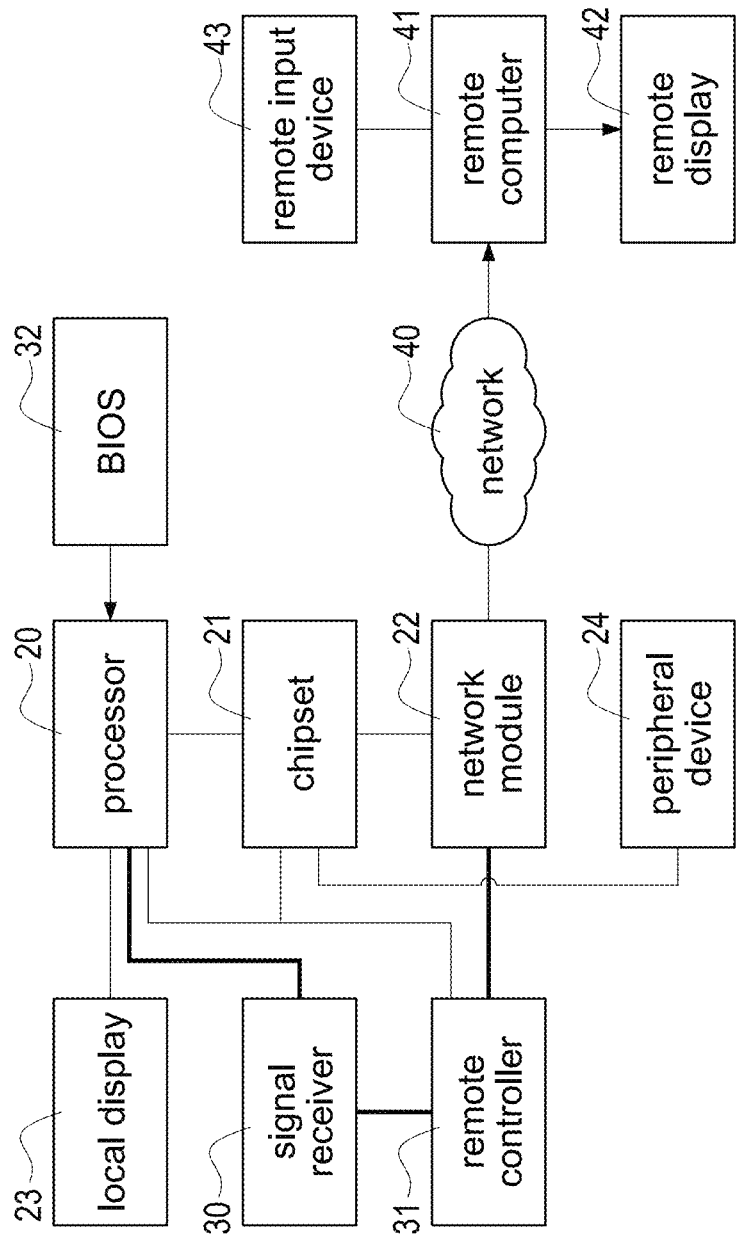
FIG. 6 illustrates an architecture diagram of the computer system of one embodiment of the present disclosure.
Figure 10:
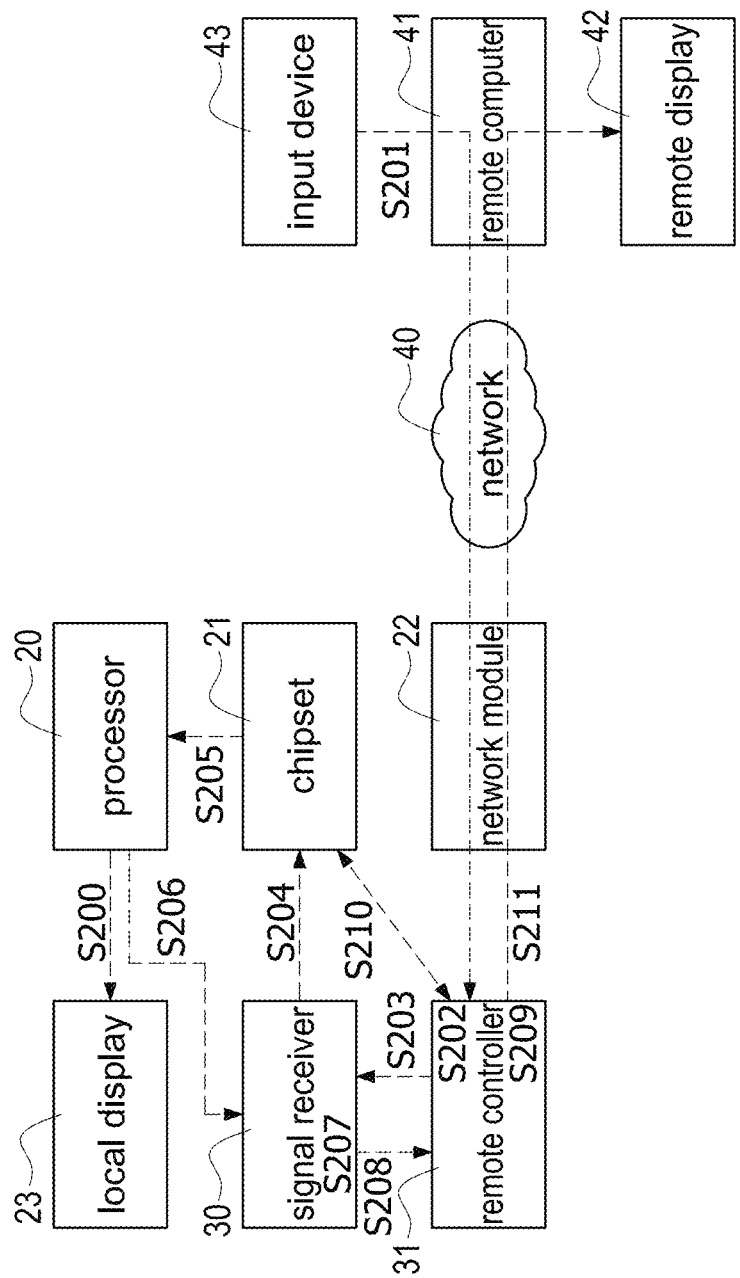
FIG. 10 illustrates an architecture diagram and a flowchart of the remote control monitoring method of one embodiment of the present disclosure.

Please refer to FIG. 6 and FIG. 10 simultaneously, FIG. 6 illustrates an architecture diagram of the computer system of one embodiment of the present disclosure, and FIG. 10 illustrates an architecture diagram and a flowchart of the remote control monitoring method of one embodiment of the present disclosure.

In this example, the local computer 2 may include one or more peripheral devices 24, such as a cooling fan device, power supply, hard disk, keyboard, mouse, etc. Each peripheral device 24 is connected to the chipset 21 for being locally monitored and controlled. Each peripheral device 24 may be further connected to the remote controller 31 (not shown in the figures) for being remotely monitored and controlled. The remote controller 31 is connected to the chipset 21 and the processor 20.

The remote control monitoring may include the Basic Input/Output System (BIOS) 32. The BIOS 32 is installed in the local computer 2 (such as being installed in the EEPROM). The BIOS 32 is loaded and executed after the local computer 2 is booted, so as to execute the hardware initialization of the local computer 2.

In one of the exemplary embodiments, when the local computer 2 loads and executes the BIOS 32, the BIOS 32 may set the first video signal port (such as the video signal port 502 as shown in FIG. 4) and the second video signal port (such as the video signal port 503 as shown in FIG. 4) connected to the processor 20 to be a mirror display mode to make the two video signal ports be configured to transmit the same first video signal.

The execution flow of the remote control monitoring method of this embodiment is below.

In the step S200, the processor 20 continuously transmits the video signal of the local display screens to the local display 23 for displaying after being booted.

When the remote mirror display is executed, the step S201 is executed, the remote user may operate the input device 43 of the remote computer 41 to send a remote switch request through the network 40 to the remote controller 31. The above-mentioned remote switch request may include the login data, such as any combination of the account name, password, IP address of remote computer 41, MAC address of remote computer 41, and the other verifiable information.

In the step S202, the remote controller 31 may execute an authentication on the login data of the remote switch request after the remote switch request is received. For example, the remote controller 31 may determine whether the login data is consistent with the predefined registration data.

In one of the exemplary embodiments, the remote computer 41 may further send an operation command or a check request of the peripheral device 24 to the remote controller 31, the remote controller 31 may execute the corresponding control (such as direct controlling or controlling through the chipset 21) based on these requests. For example, the remote controller 31 may control the peripheral device 24 based on the operation command, or return the status information of the peripheral device 24 as the step S210.

For example, the operation command may be the mouse input operation and/or the keyboard input operation from the remote end to the local end. The remote computer 41 may control the local end to trigger the corresponding mouse event and/or the corresponding keyboard event based on the control request.

In the step S203, the remote controller 31 transmits an enabling display notification to the signal receiver 30 after the remote switch request is verified.

In the step S204, the signal receiver 30 may be connected to the chipset 21, such as the pins of General-purpose input/output (GPIO), and transmit the enabling display notification to the chipset 21.

In the step S205, the chipset 21 notifies the processor 20 to enable the video signal port (such as the video signal port 503 shown in FIG. 4) connected to the signal receiver 30.

In the step S206, the processor 20 starts to transmit the first video signal corresponding to the local display screens to the signal receiver 30.

In the step S207, the signal receiver 30 transforms the first video signal into the second video signal supported by the remote controller 31.

In the step S208, the signal receiver 30 inputs the second video signal to the remote controller 31.

In the step S209, the remote controller 31 transforms the second video signal into the network-transportable video data.

In one of the exemplary embodiments, step S210, the remote controller 31 may obtain the status information of the components, such as the peripheral device 24, the network module 22, the devices connected to the chipset 21, etc., of the local computer 2 by the chipset 21 or direct connection, and transmit the obtained status information to the remote computer 41.

In the step S211, the remote controller 31 transmits the video data through the network module 22 to the remote computer 41, the remote computer 41 processes the video data and starts to display the remote display screens mirroring the local display screens on the remote display 42.

Thus, the present disclosure may make the remote display 42 be switched to display the local display screens, make the remote input devices 43 be able to control the local computer 2, and achieve the remote KVM switch function.

Please be noted that the present disclosure may further provide a display screen refresh function and a disconnection control function during the execution of remote mirror display.

Figure 11:
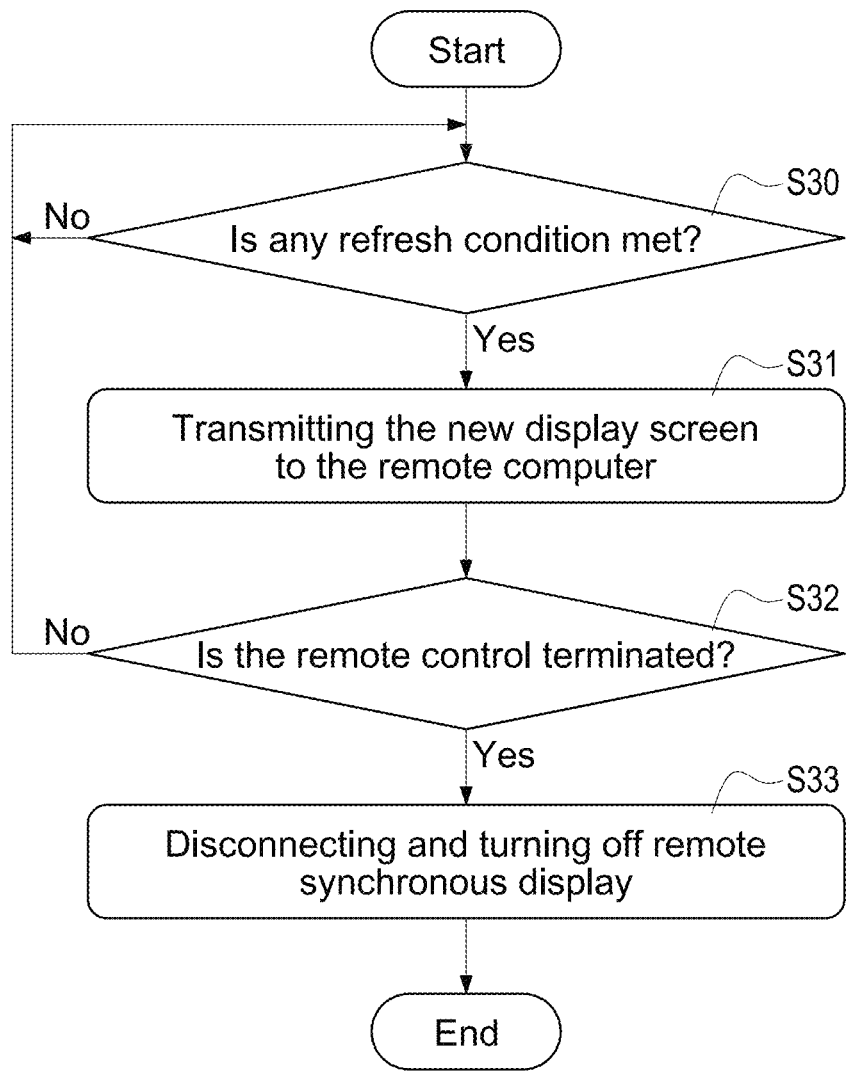
FIG. 11 illustrates a partial flowchart of the remote control monitoring method of one embodiment of the present disclosure.

More specifically, please refer to FIG. 11, FIG. 11 illustrates a partial flowchart of the remote control monitoring method of one embodiment of the present disclosure.

In the step S30, during executing the remote mirror display, at least one of the signal receiver 30, the remote controller 31, and the processor 20 continuously detects whether a preset refresh condition is met. The refresh condition may include the local display screen being changed or a preset time interval (such as 1/30 seconds) being elapsed.

In the step S31, the signal receiver 30 (and the remote controller 31) executes the above-mentioned steps S10-S14 (or the steps S206-S211) again to obtain the new (current) first video signal the new (current) local display screens from the processor 20, executes the signal transforming process on the new first video signal to generate the new second video signal, executes the network compressing process on the new second video signal to generate the new video data, and transmits the new video data through the network module 22 to the remote computer 41. Then, the remote display 42 refreshes its screen to display the new remote display screens corresponding to new local display screens.

Thus, the present disclosure may achieve the display screen refresh function of remote display screen.

In the step S32, at least one of the signal receiver 30 and the remote controller 31 detects whether the remote control is terminated (discontinued), such as the remote user disconnects the connection, or connection timed out, etc.

In the step S32, when termination of the remote control is detected, the remote controller 31 sends a disabling display notification through the signal receiver 30 to the chipset 21, and the chipset 20 notifies the processor 20 to stop providing the first video signal to the signal receiver 31 to stop providing the mirror display screens.

Please be noted that, when the remote mirror display is started, the processor 20 may configure the video signal port 503 (as shown in FIG. 4) connected to the signal receiver 30 to be "display connected". In other words, the local user may watch through the local computer 2 that the local computer is connected to two displays simultaneously, one is the local display 23, another is the remote display 42.

If the connection between the remote controller 31 and the remote computer 41 is disconnected without changing the above configuration of the video signal port 503, the local user continuously sees that the local computer 2 is connected to two displays even if the remote control is terminated. This situation may cause confusion to the local user.

In this regard, the present disclosure notifies the processor 20 to stop proving the video signal to the signal receiver 31 through the chipset 21 when the remote control is terminated. The above feature enables the processor 20 to automatically configure the video signal port 502 (as shown in FIG. 4) connected to the signal receiver 30 to be "display removed" after the termination of the remote mirror display. The local user may see that the local computer 2 is connected to only one display (local display 23), and the confusion to the local user is avoided. The present disclosure can improve the user experience.

Figure 7:
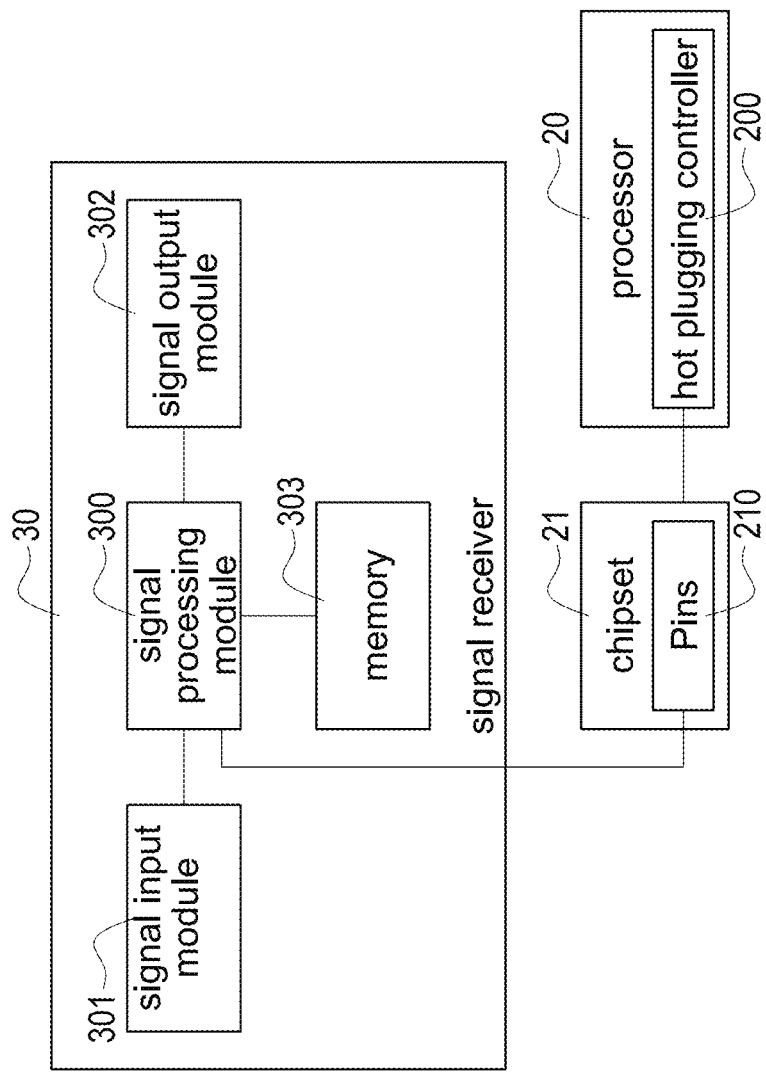
FIG. 7 illustrates an architecture diagram of the signal receiver of one embodiment of the present disclosure.

Please refer to FIG. 7, FIG. 7 illustrates an architecture diagram of the signal receiver of one embodiment of the present disclosure. In this exemplary embodiment, the signal receiver 30 may include a signal input module 301, a signal output module 302, a memory 303, and a signal processing module 300 electronically connected to the above components.

The signal input module 301, such as DisplayPort signal input, is used to receive the first video signal. The signal output module 302, such as TTL 24 bits signal output, is used to output the transformed second video signal. The memory 303, such as flash memory or cache memory, is used to store data. The signal processing module 303 is used to execute the above-mentioned signal transforming process.

In one of the exemplary embodiments, the signal processing module 300 is connected to a set of pins 210, such as GPIO pins, of the chipset 21, and executes the signal transmission with a hot plugging controller 200 of the processor 20. By the above architecture, the signal processing module 300 may control the processor 20 to change the status of the video signal port 503 (shown in FIG. 4), such as configuring the video signal port 503 to be "display connected" or "display removed". The signal processing module 300 may control the processor 20 to start to provide the first video signal and/or stop providing the first video signal.

Figure 8:
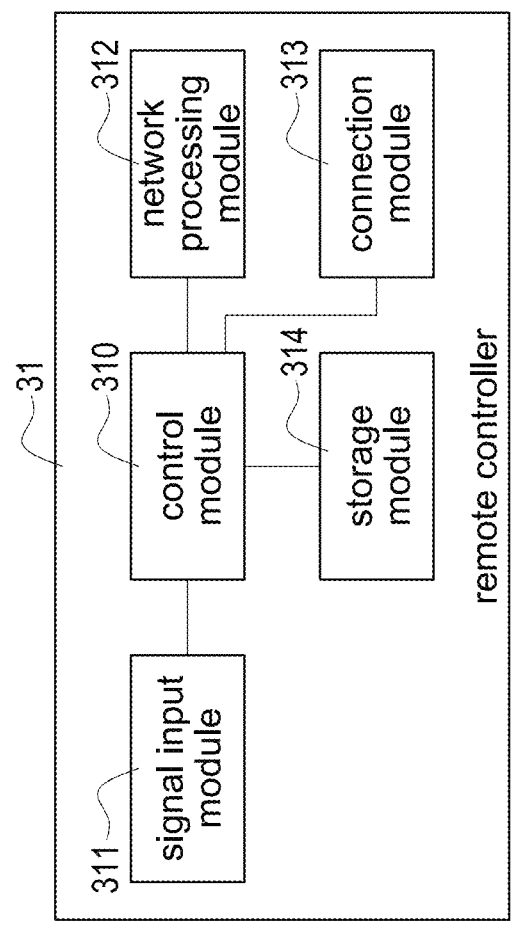
FIG. 8 illustrates an architecture diagram of the remote controller of one embodiment of the present disclosure.

Please refer to FIG. 8, FIG. 8 illustrates an architecture diagram of the remote controller of one embodiment of the present disclosure. In this exemplary embodiment, the remote controller 31 may include a signal input module 311, a network processing module 312, a connection module 313, a storage module 314, and a control module 310 electrically connected to the above components.

The signal input module 311, such as TTL 24 bits signal output, is used to receive the second video signal. The network processing module 312 is used to execute the above-mentioned network compressing process. The storage module 314, such as flash memory or cache memory, is used to store data. The control module 310 is used to execute the above-mentioned remote monitoring and control function.

In one of the exemplary embodiments, the remote controller 31 may be obtained by modifying the BMC, such as AST2400, AST2500, AST 2600 of ASPEED® or the other System on Chip (SoC). More specifically, the BMC may include signal output module (such as TTL 24 bits signal output), the present disclosure may modify this signal output module to connect to the signal receiver 30 as the signal input module.

The present disclosure may be implemented by modifying the existing chips, thereby the present disclosure may significantly save the cost to developed and produce the new functional chips.

Figure 12:
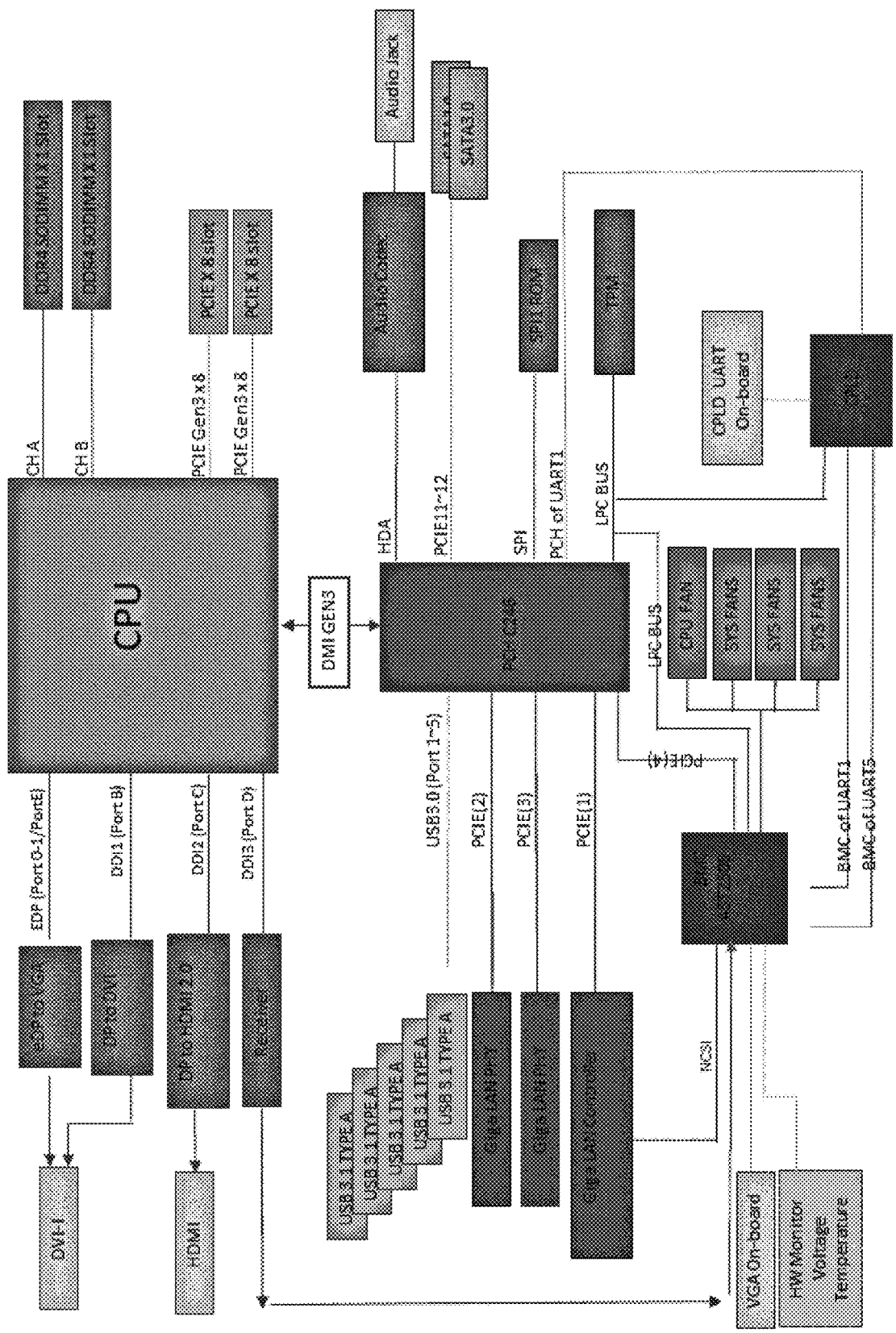
FIG. 12 illustrates an architecture diagram of the computer system of one embodiment of the present disclosure.

FIG. 12 illustrates an architecture diagram of the computer system of one embodiment of the present disclosure. FIG. 12 is used to exemplary explain one implementable example of the computer system with the remote control monitoring function of the present disclosure, but this specific example is not intended to limit the applicable architectures of the present disclosed example.

Hereafter only describes the changes between this embodiment and previous embodiments of the present disclosure. In this example, the chipset may be the chipset of PCH C246. The processor 20 (CPU) is connected to the signal receiver 30 (receiver) through the video signal port DDI 3 (Port D). The remote controller 31 may be the BMC of AST2500, and is connected to the network module (Giga LAN Controller) through the Network Controller Sideband Interface (NCSI). The remote controller 31 may further be connected to the chipset 21 through the PCIE (4).

Thus, the remote controller 31 and the signal receiver 30 are able to achieve the remote mirror display.

Figure 13:
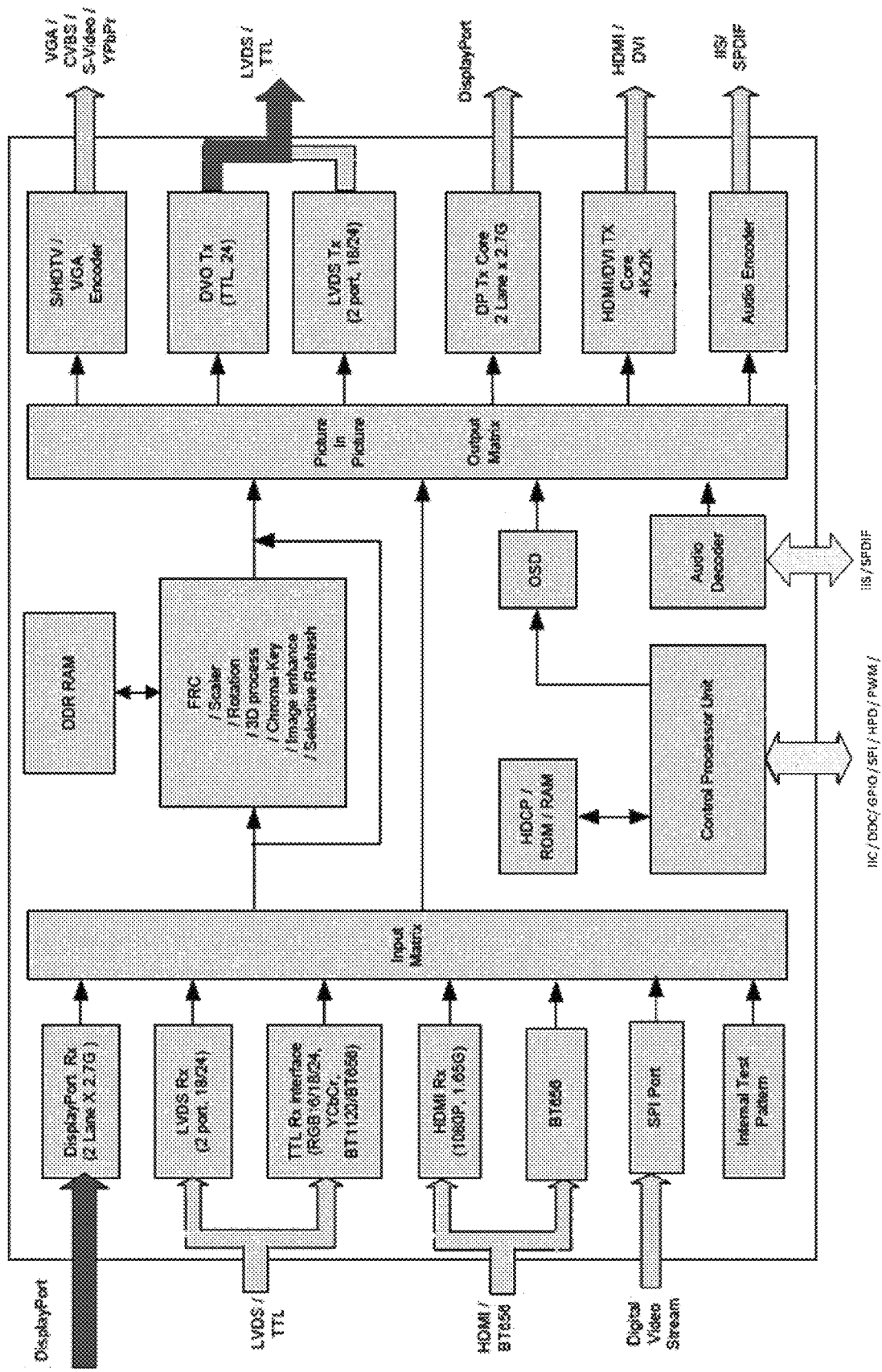
FIG. 13 illustrates an architecture diagram of the signal receiver of one embodiment of the present disclosure.

FIG. 13 illustrates an architecture diagram of the signal receiver of one embodiment of the present disclosure. FIG. 13 is used to exemplary explain one implementable example of the signal receiver 30 of the present disclosure, but this specific example is not intended to limit the applicable architectures of the signal receiver 30 of the present disclosed example.

In this example, the signal receiver 30 may be obtained by modifying the display adapter chip, such as the CH7038 chip, but this specific example is not intended to limit the applicable signal receiver of the present disclosed example.

More specifically, as shown in FIG. 13, the display adapter may include multiple types of input interfaces, multiple types of output interfaces, and the other signal control. The input interfaces may include any combination of DisplayPort, LVDS/TTL, HDMI/BT656, Digital Video Stream, etc. The output interfaces may include any combination of VGA/CVBS/S-Video/YPbPr, LVDS/TTL, DisplayPort, HDMI/DVI, IIS/SPDIF, etc. The signal control may be any combination of the below Control Processor Unit, Audio Decoder, etc. The present disclosure refers to the above-mentioned first standard and the second standard to keep the required input interface (such as DisplayPort as the first standard) and the required output interface (such as TTL as the second standard) and the related signal processing circuits (such as the central DDR RAM and the controller connected to the DDR RAM) enabling, and disable all or most of the remaining input interfaces, output interfaces, and signal control.

Due to the present disclosure can be implemented by modifying the existing chips, the present disclosure may significantly save the cost to developed and produce the new functional chips.

While this disclosure has been described by means of specific embodiments, numerous modifications and variations could be made thereto by those skilled in the art without departing from the scope and spirit of this disclosure set forth in the claims.

What is claimed is:

1. A remote control monitoring system, used to provide a local display screen generated by a local computer to a remote computer in real-time to implement a remote real-time display, the remote control monitoring system comprising:
   a display adapter, connected to a local display of the local computer;
   a signal receiver, connected to a processor of the local computer, wherein the processor comprises a first video signal port connected to the display adapter and a second video signal port connected to the signal receiver, wherein the signal receiver is configured to receive a first video signal corresponding to the local display screen from the second video signal port of the processor, and the signal receiver executes a signal transforming process on the first video signal to generate a second video signal in a standard different from the first video signal, wherein the first video signal port and the second video signal port are set to be a mirror display mode to transmit the first video signal of same content; and
   a remote controller, connected to the signal receiver and a network module of the local computer, and configured to execute a network compressing process on the second video signal to generate a video data compatible with a network-transportable standard, and transmitting the video data through the network module to the remote computer to display a remote display screen corresponding to the local display screen based on the video data;
   wherein the signal receiver is configured to execute the signal transforming process to transform the first video signal compatible with an output standard of the processor into the second video signal compatible with an input standard of the remote controller.

2. The remote control monitoring system according to claim 1, wherein the signal receiver is configured to receive the first video signal by a Data Direct Input (DDI) from the processor;
   wherein the first video signal is compatible with a DisplayPort standard, the second is compatible with one of an HDMI standard, a VGA standard, a DVI standard, a TTL standard, an LVDS standard, a CVBS standard, an S-Video standard and a YPbPr standard;
   wherein the remote controller is configured to connect the network module by a network controller sideband interface (NCSI) standard.

3. The remote control monitoring system according to claim 1, wherein the remote controller is connected to a plurality of peripheral devices of the local computer, the remote controller is configured to retrieve a status information of each peripheral device and transmit the status information to the remote computer, or control the peripheral device corresponding to an operation command based on the operation command sent from the remote computer.

4. The remote control monitoring system according to claim 1, wherein the remote controller is connected to a chipset of the local computer, the remote controller is configured to retrieve a status of a peripheral device connected to the chipset through the chipset, or control the peripheral device through the chipset.

5. The remote control monitoring system according to claim 1, wherein the signal receiver is connected to a chipset of the local computer;
   wherein when a remote switch request from the remote computer being verified is received, the remote controller is configured to send an enabling display notification through the signal receiver to the chipset to notify the processor to provide the first video signal to the signal receiver.

6. The remote control monitoring system according to claim 5, wherein the signal receiver is connected to a hot plugging controller of the processor through the chipset.

7. The remote control monitoring system according to claim 5, wherein when a remote control is terminated, the remote controller is configured to send a disabling display notification through the signal receiver to the chipset to notify the processor to stop providing the first video signal to the signal receiver.

8. The remote control monitoring system according to claim 1, wherein the signal receiver is configured to receive a new first video signal corresponding to a new local display screen from the processor when a refresh condition is met, and execute the signal transforming process on the new first video signal to generate a new second video signal;
   the remote controller is configured to execute the network compressing process on the new second video signal to generate a new video data when the refresh condition is met, and transmit the new video data through the network module to the remote computer to display a new remote display screen corresponding to the new local display screen.

9. The remote control monitoring system according to claim 1, further comprising: a basic input/output system (BIOS), installed in the local computer and loaded for execution when the local computer is booted, wherein the BIOS is configured to set the first video signal port and the second video signal port connected to the processor to be the mirror display mode.

10. The remote control monitoring system according to claim 1, further comprising: a high-speed hub, wherein the high-speed hub comprises at least one input interface and a plurality of output interfaces, the input interface is connected to the signal receiver, two of the output interfaces are respectively connected to the remote controller and a display connector of the local computer;
    wherein the high-speed hub is configured to broadcast the second video signal received from the signal receiver to the remote controller and the display connector.

11. A computer system with a remote control monitoring function, the computer system comprising:
    the remote control monitoring system according to claim 1;
    the network module, connected to the remote control monitoring system, and configured to connect a remote computer through a network, and transmit a video data received from the remote control monitoring system to the remote computer;
    the local display; and
    the processor, connected to the remote control monitoring system and the local display, and configured to generate a first video signal and transmit the first video signal to the local display and the remote control monitoring system to control the local display to display a local display screen and the remote computer to display a remote display screen corresponding to the local display screen.

12. A remote control monitoring method, used to provide a local display screen generated by a local computer to a remote computer in real-time to implement a remote real-time display, the local computer comprising a signal receiver, a remote controller, a processor, a network module, a local display, and a display adapter connected to the local display, the remote control monitoring method comprising following steps:
- a) by the processor, transmitting a first video signal to the local display to display the local display screen, wherein the processor comprises a first video signal port connected to the display adapter and a second video signal port connected to the signal receiver, and the first video signal port and the second video signal port are set to be a mirror display mode to transmit the first video signal of same content;
- b) by the signal receiver, receiving the first video signal from the second video signal port of the processor, executing a signal transforming process on the first video signal to generate a second video signal in a standard different from the first video signal, and transmitting the second video signal to the remote controller;
- c) by the remote controller, executing a network compressing process on the second video signal to generate a video data compatible with a network-transportable standard; and
- d) transmitting the video data through the network module to the remote computer to display a remote display screen corresponding to the local display screen based on the video data.

13. The remote control monitoring method according to claim 12, wherein the step b) comprises the signal receiver receiving the first video signal by a data direct input (DDI) from the processor;
wherein the first video signal is compatible with a DisplayPort standard, the second is compatible with one of an HDMI standard, a VGA standard, a DVI standard, a TTL standard, an LVDS standard, a CVBS standard, an S-Video standard and a YPbPr standard;
wherein the step b) comprises the remote controller transmitting the video data to the network module by a network controller sideband interface (NCSI) standard.

14. The remote control monitoring method according to claim 12, further comprising following steps:
- e1) by the remote controller, retrieving a status information of a peripheral device and transmitting the status information to the remote computer; and
- e2) controlling the peripheral device corresponding to an operation command based on the operation command sent from the remote computer.

15. The remote control monitoring method according to claim 12, further comprising following steps before the step a):
- f1) by the remote controller, sending an enabling display notification through the signal receiver to a chipset when a remote switch request from the remote computer is received; and
- f2) by the chipset, notifying a hot plugging controller of the processor to make the processor provide the first video signal to the signal receiver.

16. The remote control monitoring method according to claim 15, further comprising following step before the step f1):
- g) by the remote controller, receiving a login data through the network module from the remote computer, and executing an authentication on the login data;
wherein the step f1) comprises receiving the remote switch request when the login data is verified.

17. The remote control monitoring method according to claim 15, further comprising the following steps:
- h1) by the remote controller, sending a disabling display notification through the signal receiver to the chipset when a remote control being terminated is detected; and
- h2) by the chipset, notifying the processor to stop providing the first video signal to the signal receiver.

18. The remote control monitoring method according to claim 12, further comprising a step i), when a refresh condition is met, executing the step b) to the step d) to transmit a new video data to the remote computer to display a new remote display screen corresponding to a new local display screen.

19. The remote control monitoring method according to claim 12, further comprising following steps before the step a):
- j1) loading a basic input/output system (BIOS) when the local computer is booted; and
- j2) by the BIOS, setting the first video signal port and the second video signal port to be the mirror display mode.

20. The remote control monitoring method according to claim 12, wherein the processor transmits the first video signal to a high-speed hub through the signal receiver to make the high-speed hub broadcast the first video signal to the local display and the remote controller.

* * * * *